United States Patent
Patel et al.

(10) Patent No.: US 8,537,721 B2
(45) Date of Patent: Sep. 17, 2013

(54) METHOD FOR SCHEDULING TRANSMISSIONS OF GLOBAL BEACONS IN BODY AREA NETWORKS

(75) Inventors: Maulin D. Patel, Tuckahoe, NY (US); Richard Chen, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 182 days.

(21) Appl. No.: 13/058,009

(22) PCT Filed: Aug. 7, 2009

(86) PCT No.: PCT/IB2009/053491
§ 371 (c)(1),
(2), (4) Date: Apr. 6, 2011

(87) PCT Pub. No.: WO2010/018516
PCT Pub. Date: Feb. 18, 2010

(65) Prior Publication Data
US 2011/0176459 A1    Jul. 21, 2011

Related U.S. Application Data

(60) Provisional application No. 61/087,746, filed on Aug. 11, 2008.

(51) Int. Cl.
*H04L 12/00* (2006.01)
*H04J 9/00* (2006.01)

(52) U.S. Cl.
USPC ........... 370/256; 370/235; 370/338; 370/254; 370/329; 370/443; 370/236; 370/237; 370/238; 370/445; 607/60; 128/899

(58) Field of Classification Search
USPC ................. 370/235–238, 312, 254, 338, 348, 370/329, 443–445, 351–356, 408–418; 455/41.1, 41.2, 41.3, 63.1; 607/60; 128/899
See application file for complete search history.

(56) References Cited

U.S. PATENT DOCUMENTS 7,539,146 B2 *   5/2009   Wu et al. ........................ 370/241
7,561,549 B2 *   7/2009   Meier et al. .................... 370/331
(Continued)

OTHER PUBLICATIONS

Kohvakka M et al: "Performance Analysis of IEEE 802.15.4 and Zigbee for Large-Scale Wireless Sensor Network Applications" ACM 1, Oct. 6, 2006, pp. 48-57, XP040048073.

(Continued)

*Primary Examiner* — Dang T Ton
*Assistant Examiner* — Sai Aung
(74) *Attorney, Agent, or Firm* — Larry Liberchuk

(57) ABSTRACT

A method (400) for scheduling transmissions of global beacons in a body area network (BAN). The BAN includes master nodes and slave nodes where master nodes are arranged in a tree topology. The method comprises propagating ascending global beacons (AGBs) from leaf nodes to a root node of the tree during an ascending period (S420), wherein an AGB includes at least reservations of time slots during a time round; processing AGBs by the root node to determine time slot occupancy information (S430); propagating descending global beacons (DGBs) from the root node to leaf nodes during a descending period (S440), wherein a DGB includes at least reservations of time slots during the time round; and processing DGBs by master nodes other than the root node to update at least the slot occupancy information included in the DGBs (S450).

15 Claims, 10 Drawing Sheets

(56) References Cited

U.S. PATENT DOCUMENTS

| | | | | |
|---|---|---|---|---|
| 7,701,858 | B2 * | 4/2010 | Werb et al. | 370/241 |
| 8,023,441 | B2 * | 9/2011 | Werb et al. | 370/311 |
| 8,265,014 | B2 * | 9/2012 | Reumerman et al. | 370/329 |
| 2006/0159053 | A1 * | 7/2006 | Donovan | 370/338 |
| 2007/0036089 | A1 * | 2/2007 | Metke et al. | 370/254 |
| 2007/0211681 | A1 * | 9/2007 | Sun et al. | 370/338 |
| 2007/0253345 | A1 * | 11/2007 | Habetha et al. | 370/254 |
| 2008/0259895 | A1 * | 10/2008 | Habetha et al. | 370/345 |
| 2010/0061271 | A1 * | 3/2010 | Seyedi-Esfahani et al. | 370/254 |

OTHER PUBLICATIONS

Anis Koubaa et al: "Modeling and Worst-Case Dimensioning of Cluster-Tree Wireless Sensor Networks" Real-Time Systems Symposium, 2006. RTSS '06. 27th IEEE Internatio nal, IEEE, PI, Dec. 1, 2006, pp. 412-421, XP031031871.

Anis Koubaa et al: "A Time Division Beacon Scheduling Mechanism for IEEE 802.15.4/Zigbee Cluster-Tree Wireless Sensor Networks" Real-Time Systems, 2007. ECRTS '07. 19th Euromicro Conference on, IEEE, PI, Jul. 1, 2007, pp. 125-135, XP031115426.

* cited by examiner

| Node ID | Root A dies in round *n* | | | | |
|---|---|---|---|---|---|
| | countdownomeRoot = slotDist in round *n* | countDownToBecomeRoot at the end of round *n+1* | countDownToBecomeRoot at the end of round *n+2* | countDownToBecomeRoot at the end of round *n+3* | countDownToBecomeRoot at the end of round *n+4* |
| B | 2 | 1 | 0<br>New root | | |
| C | 3 | 2 | 1 | 2<br>countDownToBecomeRoot = slotDist | 2 |
| D | 4 | 3 | 2 | 3<br>countDownToBecomeRoot = slotDist | 3 |
| E | 5 | 4 | 3 | 2 | 4<br>countDownToBecomeRoot = slotDist |
| F | 6 | 5 | 4 | 3 | 5<br>(countDownToBecomeRoot = slotDist) |

FIG. 10

METHOD FOR SCHEDULING TRANSMISSIONS OF GLOBAL BEACONS IN BODY AREA NETWORKS

This application claims the benefit of U.S. Provisional Application No. 61/087,746 filed on Aug. 11, 2008.

The invention generally relates to medium access control (MAC) protocols utilized in body area networks (BANs).

A body area network (BAN) is primarily designed for permanent monitoring and logging of vital signs. An exemplary BAN, as shown in FIG. 1, includes multiple nodes 120 which are typically sensors that can be either worn or implanted into the human body. The nodes 120 monitor vital body parameters and movements, and communicate with each other over a wireless medium. The nodes 120 can transmit data from a body to one or more nodes 130, from where the data can be forwarded, in real-time, to a hospital, clinic or elsewhere over a local area network (LAN), a wide area network (WAN), a cellular network, and the like.

The requirements for designing BANs include energy efficiency of nodes 120 and 130, scalability, integration, interference mitigation, coexistence, high quality of service (QoS) and security. Efficient energy consumption can be achieved by optimally duty cycling a receiver node (i.e., a node receiving data) between a listen state and a sleep state. In the sleep state the transceiver of the node is turned off, thereby saving energy. A duty cycling may be performed by a MAC protocol with the aim of minimizing idle listening, overhearing, collisions and controlling overhead.

In the related art, several MAC protocols are disclosed for short range wireless networks. For example, the IEEE 802 standards committee has developed a family of standards for wireless local and personal area networks, such as the IEEE 802.11 standard designed for wireless local area networks (WLANs) and the IEEE 802.15.4 standard designed for wireless personal area networks (WPANs).

BANs are intended to be used for life-critical medical applications. Therefore, reliability, fault-tolerance, and QoS are the fundamental requirements besides energy efficiency. The nodes within the same BAN and multiple BANs may move in and out of range due to twisting, turning, walking and running. Hence, to achieve the fundamental requirements BAN should be agile for frequent topology and density changes. The MAC protocols proposed for WLANs and WPANs do not address these issues effectively, rendering them unsuitable for BANs.

Specifically, in contrast to the above mentioned wireless networks, BANs are highly localized networks. Typically, the transmission range of a BAN node is 3 meters. Given the fact that the distance between any two nodes on the body is less than 3 meters, most nodes on the body would be in direct communication range of each other. However, in some cases the nodes could be hidden from each other due to body shadowing. For example, a node on the front of the body may not be reachable from another node on back of the body due to heavy path loss. Hence, multi-hop communication is needed to provide the connectivity between any two nodes on the body.

Due to the proximity of nodes on a body, a time division multiple access scheme is the preferred way to avoid message collisions and improve the reliability. In this scheme the channel access time is divided into fixed and repeated duration time rounds. Thus, a time round is a repeated and fixed duration of time, during which nodes can access the medium. All the nodes in the network synchronize their clocks once per round with the help of global beacon messages. Periodic clock synchronization is necessary to overcome clock drifts. Round time is further divided into fixed duration time slots, which serve as a basic unit of medium reservation. Nodes reserve time slots, during which they have exclusive right to access the medium. To enable conflict-free time slot reservations, the time slot requests and allocations must be known to all the nodes in the network.

In a preferred embodiment of the invention, global beacons are also utilized to exchange reservation requests, i.e., to reserve time slots during which a node can access the medium. During the global beacon period of the current round, all the nodes exchange their reservation requests for the next round. Based on requests received during a current round, conflict-free time slot allocation is derived for the next round. Proper sequence of transmissions of global beacons is crucial to ensure that the reservation requests are propagated globally. For example, as illustrated in FIG. 2, three nodes 200-X, 200-Y and 200-Z are arranged in a linear topology. Nodes 200-X and 200-Z are hidden from each other, but are within a transmission range from 200-Y.

In this topology, suppose a node 200-X transmits the first global beacon followed by a global beacon transmitted by a node 200-Y which is followed by a global beacon of node 200-Z. Each global beacon carries reservation requests that the node has received directly or indirectly during current round. Nodes listen to their neighbor's global beacons to learn of their reservation requests. In this case, a global beacon sent by node 200-X precedes a node 200-Y beacon, thus enabling the node 200-Y to learn about reservation requests of the node 200-X for the next round. Therefore, a global beacon of a node 200-Y carries reservation requests of node 200-X as well. Similarly, a global beacon, sent by the node 200-Z, carries reservation requests of nodes 200-X and 200-Y. At the end of this global beacon sequence, nodes 200-Y and 200-Z know the reservation requests of all 3 nodes. However, the node 200-X does not receive the reservation request from a node 200-Z. As another example, suppose a node 200-Y transmits the first global beacon, followed by a node 200-Z, which is followed by a node 200-X. In this case, nodes 200-X and 200-Z do not receive reservation requests of each other.

For the topology shown in FIG. 2, a proper sequencing of global beacons would be needed. For example, a node 200-X transmits the first global beacon followed by a node 200-Z global beacon. Then, a node 200-Y learns about reservation requests of nodes 200-X and 200-Z for the next round by listening to their global beacons. In this case, the node 200-Y embeds its own reservation requests in addition to the reservation requests of node 200-X and node 200-Z in its global beacon and transmits the last global beacon which enables each node to learn of reservation requests from all nodes.

The above examples clearly demonstrate that to propagate reservation requests globally, sequencing of global beacons cannot be performed arbitrary. Therefore, it would be desirable to provide a method for scheduling the transmissions of global beacons to efficiently propagate reservation requests.

Certain embodiments of the invention include a method for scheduling transmissions of global beacons in a body area network (BAN). The BAN includes master nodes and slave nodes where the master nodes are arranged in a tree topology. The method comprises propagating ascending global beacons (AGBs) from leaf nodes to a root node of the tree during an ascending period, wherein an AGB includes at least reservations of time slots during a time round; processing AGBs by the root node to determine time slot occupancy information; propagating descending global beacons (DGBs) from the root node to leaf nodes during a descending period, wherein a DGB includes at least reservations of time slots during the time round; and processing DGBs by the master nodes, other than the root node, to update at least the slot occupancy information included in the DGBs.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 10 is an example for the process performed when a root node dies.

Figure 1:
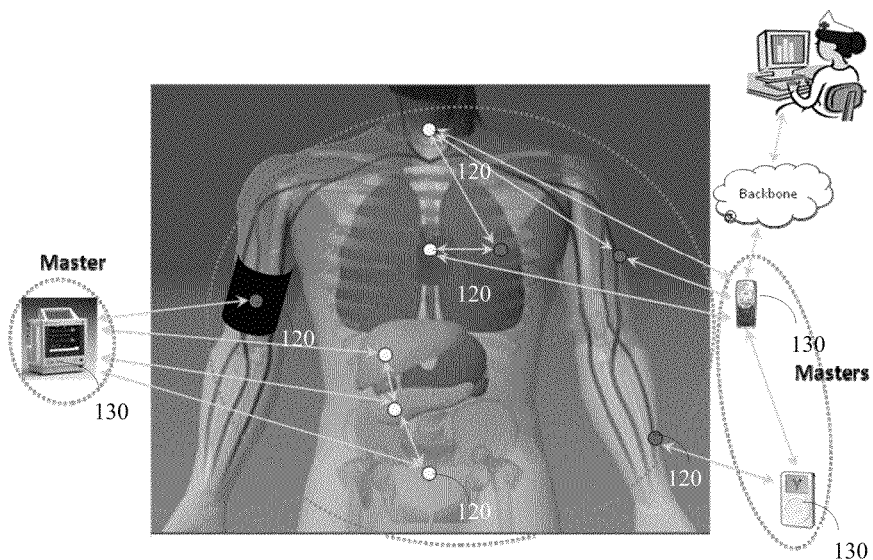
FIG. 1 is a schematic diagram of a body area wireless network.
Figure 2:
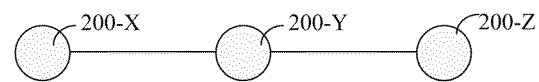
FIG. 2 illustrates a linear topology of a body area network describing an arbitrary technique for scheduling global beacons.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

One embodiment of the invention provides a method for global beacon scheduling which is essential for enabling synchronization, medium reservation, QoS, and fault tolerance in at least body area networks (BANs). The method enables dynamic and scalable duty cycling that can be adapted to achieve latency requirements and traffic conditions of the BAN, thereby saving power without compromising QoS. In accordance with the principles of the invention, the global beacon scheduling method constructs and maintains a (logical) tree topology of master nodes in a body area network (BAN). In a tree topology, nodes have parent-child relationships, where a root node does not have a parent and all other nodes have exactly one parent. A node may have multiple children. A node which does not have any children is a leaf node.

According to an embodiment of the invention, predefined time slots in a time round 310 (shown in FIG. 3C) are reserved for a global beacon period (GBP) 320. The master nodes listen to the global beacon period and send global beacons in their allocated time slots to synchronize their clocks and exchange reservation requests. A global beacon period is further divided into two time periods: an ascending period (AP) 322 and a descending period (DP) 324. In a preferred embodiment of the invention, the duration of a time round is significantly larger than the duration of the global beacon period, thereby minimizing control overhead.

Figure 3A:
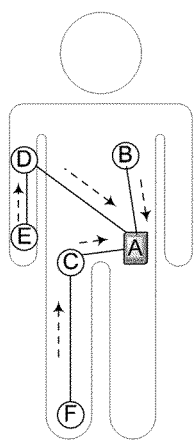
FIG. 3A illustrates the direction of information propagation in a tree topology during an ascending period.
Figure 3B:
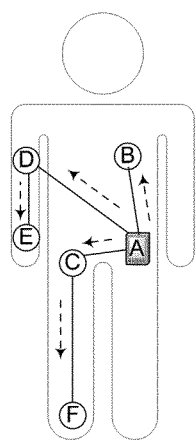
FIG. 3B illustrates the direction of information propagation in a tree topology during a descending period.

During the ascending period the information is passed to ancestors (parents) and during the descending period the information is passed to descendants (children). This is further illustrated in FIGS. 3A and 3B, which respectively illustrate the direction of information propagation in a tree topology during the ascending period and the descending period. A node "A" is the root and the nodes "B", "E" and "F" are leaf nodes. All the devices which send their global beacons during the global beacon period are collectively referred to as a beacon group. In this example, the beacon group consists of devices A, B, C, D, E and F.

Specifically, during the ascending period all the nodes except the root transmit their global beacons in their respective slots in ascending order, i.e., children transmit their global beacons before their parents. An orphan node is a node which does not discover its parent. During this period parents listen to their children's global beacons as well as orphan nodes' global beacons. Examples of the ascending sequence of global beacon transmissions based on the tree topology (shown in FIG. 3A) are F→E→D→C→B→A and B→E→D→F→C→A.

During the descending period the sequence of global beacon transmissions is reversed, i.e. parents transmit their global beacons before their children. In this period children listen to their parent's global beacons. During the descending period leaf nodes and orphans need not transmit their global beacons. Examples of the descending sequence of global beacon transmissions based on the tree topology (shown in FIG. 3B) are A→B→C→D→E→F and A→C→F→D→E→B.

It should be noted that the descending sequence is the reverse of the ascending sequence, i.e., if the ascending sequence is B→E→D→F→C→A, the descending sequence is A→C→F→D→E→B. As the root need not transmit its global beacon during an ascending period and leaf nodes need not transmit their global beacons during a descending period, the ascending and descending sequences of global beacon transmissions may include vacant time slots. For example, in FIG. 3D the ascending sequence is F→E→D→C→B→_ and the corresponding descending sequence is A→_→C→D→_→_, where "_" indicates vacant slots. By omitting global beacon transmissions the nodes save power.

The reservation requests and other relevant information are propagated towards the root during the ascending period using ascending global beacons (AGBs). At the end of the ascending period, the root knows the complete global topology and reservation requests of all the master nodes. During the descending period the root distributes the information to all the nodes using downstream global beacons (DGBs). At the end of the descending period, all the master nodes receive the required information from the root.

It should be noted that all nodes need not be in direct communication range of the root. The information propagates from child to parent during the ascending period and from parent to child during the descending period. In the above example, during the ascending period, node "D" receives an ascending global beacon from node "E" and embeds that information into its own ascending beacon to be received by root "A". Similarly, during the descending period, node "D" receives descending global beacons from root "A" and embeds that information into its own descending beacon to be received by node "E". It should be noted that root "A" and node "E" are outside the direct communication range of each other. However, root "A" receives reservation requests from node "E" through node "D", and node "E" receives root response through node "D". The protocol ensures that all nodes in the beacon group receive the information.

The first node to power-on becomes the root and sends descending global beacon in the root slot in every round. Nodes which boot subsequently join the existing beacon group by sending their AGBs in the "joining slot" within a joining window 330 which is depicted in FIG. 3D. Each newly joining node is assigned to a parent, and thus the tree is constructed. A joining window is a predefined number of time slots (joining slots) allocated to facilitate new nodes to join an existing beacon group. All the nodes in the beacon group listen to joining slots in the joining window. A joining window moves left, as new devices join the beacon group and occupy time slots, and moves right when devices leave the beacon group. Slot occupancy in an ascending period grows backwards and slot occupancy in a descending period grows forwards as new devices join the beacon group. If a root fails or leaves the beacon group, the node occupying the slot next to the root slot becomes the root. As shown in FIG. 3F, a node B becomes root after a node A exits the beacon group. Any unoccupied slots in an ascending period due to devices leaving the beacon group are filled by devices occupying the previous slot. Thus, in a stable state, all the global beacon slots between joining slots and root slot in the ascending period are occupied as shown in FIG. 3E. When nodes leave the beacon group, the tree is pruned as shown in FIG. 3F. Thus, the tree is constructed dynamically in a distributed fashion.

Figure 4:
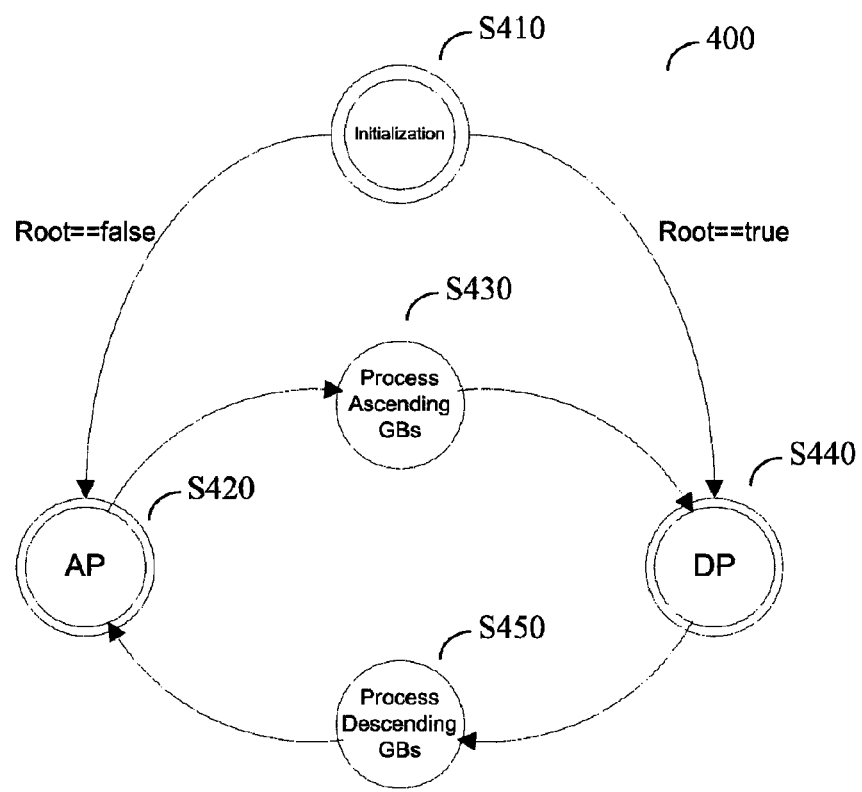
FIG. 4 is a non-limiting and exemplary diagram for describing the method for scheduling transmissions of global beacons.

FIG. 4 shows a non-limiting and exemplary diagram 400 for describing the method for operating a global beacon scheduling protocol (GBSP) disclosed in accordance with an embodiment of this invention. At S410, each master node is initialized when the node boots up. Thereafter, a repeated process is performed during different time periods. Specifically, at S420, ascending global beacons (AGBs) are propagated from the leaf nodes to the root, and then at S430, the ascending global beacons are processed by the root. At S440, descending global beacons (DGBs) are propagated from the root to all other nodes. At S450, the descending global beacons are processed by each node that is not a root. Each of the method steps is described in detail below.

Figure 5:
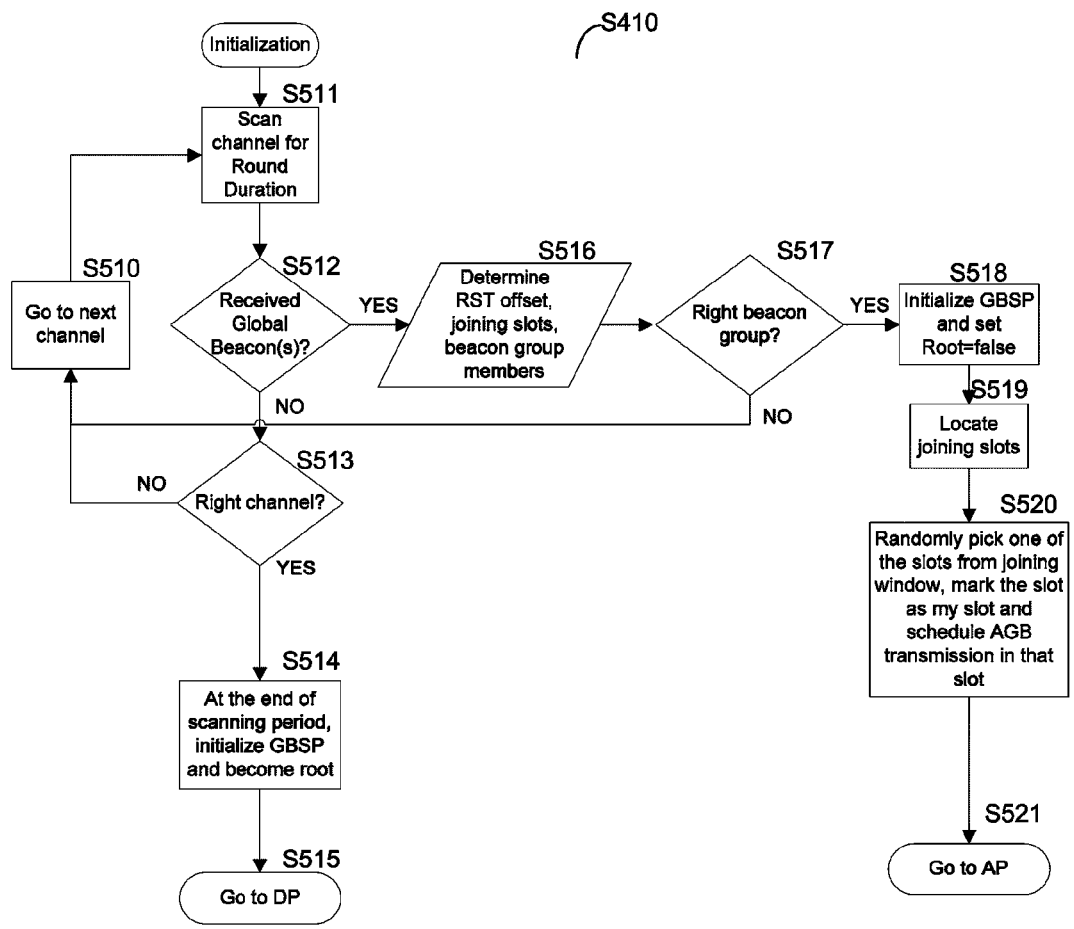
FIG. 5 is a flowchart for describing the execution of the initialization step performed in accordance with an embodiment of the invention.

FIG. 5 shows an exemplary and non-limiting flowchart describing the execution of the initialization step S410 in greater detail. Initialization step S410 is performed when the node is powered on. At S511, a master node scans for beacons during a single time round. A time round is a repeated and fixed duration of time during which nodes can access the medium. At steps S513 and S510, a master node may scan multiple channels sequentially before finding a suitable channel for operation. At S512, it is checked if a global beacon has been received during the time round. If no beacon is received and the channel is determined to be good, then at S514, the master node declares itself as a root, sets its own round start time (RST) and initializes state variables to their predefined values. Thereafter, the master node starts functioning as a root and at S515 execution proceeds to S440.

If the master node receives a global beacon, then at steps S516 and S517 the node synchronizes its RST, and determines beacon group members and the current root. At S518, the node initializes state variables accordingly and listens until the joining time slots arrive. At S519, joining time slots are located at the beginning of a global beacon period to allow up to a predefined number of nodes to join per round. A node attempting to join the existing beacon group randomly picks one of the joining slots at S520 and schedules an ascending global beacon transmission in that slot. Thereafter, at S521, the execution continues to S420.

All master nodes of an existing beacon group listen to joining time slots to discover joining nodes. A node attempting to join the beacon group must contend to access the joining time slot. If a node, attempting to join, senses that the medium is idle for a random time, the node transmits an ascending global beacon in a randomly picked joining slot during the ascending period. A joining node is considered an orphan until it successfully joins, upon which the node is assigned with a parent by the root. If a node loses the contention, then it contends again for another joining slot. Once the node sends its ascending global beacon in the joining slot, the node sleeps until a descending period arrives, during which the node listens to descending global beacons. If the node finds itself listed in a root descending global beacon during the descending period, then the node attempt to join an existing beacon group is successful. Otherwise, through the execution of step S520, the node repeats its attempts to join the beacon group during a joining window in successive rounds until either the node successfully joins or exceeds the maximum number of allowed unsuccessful joining attempts.

Figure 6:
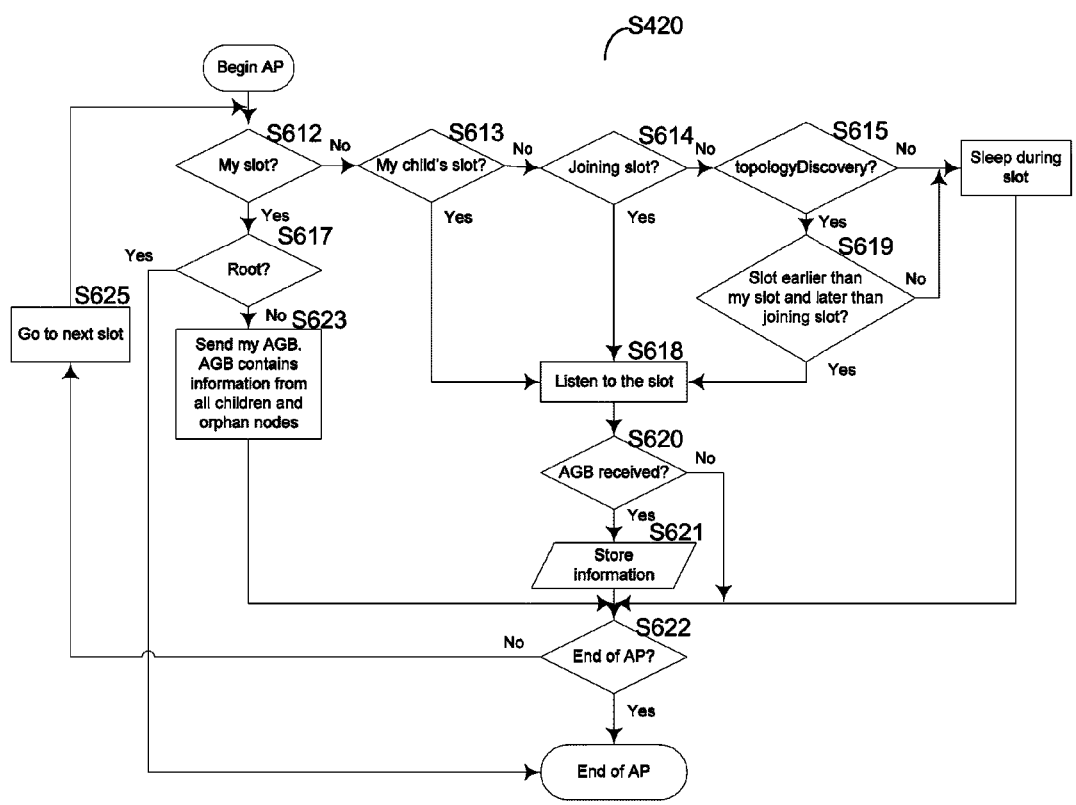
FIG. 6 is a flowchart for describing the operation of a master node during an ascending period as implemented in accordance with an embodiment of the invention.

FIG. 6 shows an exemplary flowchart S420 for describing the operation of a master node during an ascending period, as implemented in accordance with an embodiment of the invention. During the ascending period, all nodes listen to the joining time slots and their children's slots at S618. Specifically, the master node performs step S618 only if it is determined at steps S613, S614, and S615 that a current slot is owned by a child of the master node, a current slot is a joining slot, or a topologyDiscovery variable is true. In a stable state, the topologyDiscovery variable is set to false and it is set to true whenever any change in a topology is discovered. At S619, it is checked whether the slot occurs earlier than the node own slot and later than the joining slot. A node need not listen to those slots in an ascending period, which are earlier than the joining slot and later than its own slot. If at S620 it is determined that at least one ascending global beacon is received during the current slot, then at S621 the received ascending global beacon is stored. The transmitter of an ascending global beacon embeds the ID of its parent node or identifies itself as an orphan. This helps the recipient of ascending global beacons to discard any ascending global beacon received from a node which is neither its child nor an orphan.

If the current slot is the node time slot and the node is not a root (S612 and S617), then the node sends an ascending global beacon containing information received from all its children and orphan nodes. If the node is a root, execution terminates. By performing steps S622 and S625 the master node visits all time slots during the ascending period.

Figure 7:
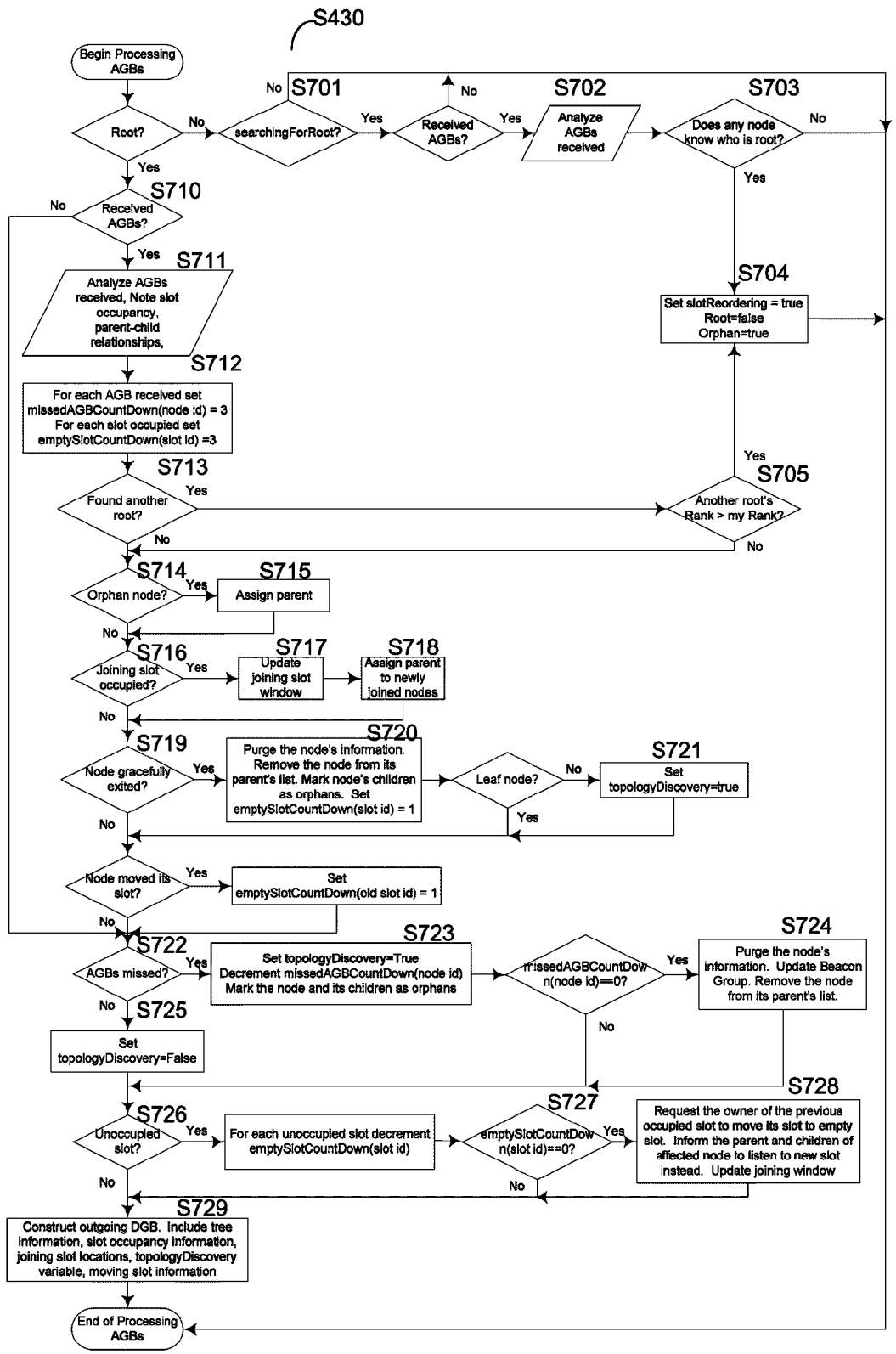
FIG. 7 is an exemplary flowchart for describing the processing of ascending global beacons as implemented in accordance with an embodiment of the invention.

FIG. 7 shows an exemplary flowchart S430 for describing the processing of ascending global beacons, as implemented in accordance with an embodiment of the invention. This process is performed by the root node which analyzes the ascending global beacons received during an ascending period. At S710, it is checked if any ascending global beacons were received, and if so execution continues with S711; otherwise, execution steps to S722. At S711, a root node analyzes the received AGB(s) to determine time slot occupancy information and evaluates current parent-child relationships. Specifically, the root counts the number of consecutive rounds during which the AGB from a node belonging to a beacon group is missed. At S712, for each received AGB the countdown variable is reset to a predetermined value, e.g., 3. Similarly, for each slot occupied the countdown variable which counts the number of consecutive rounds during which a slot remains unoccupied is also reset to a predefined value.

If a root downstream global beacon is missed for a predefined number of consecutive rounds, then a node occupying the slot next to the root slot declares itself as the new root. However, it is possible that the original root is still alive and its beacons were missed due to temporary interference. This could lead to a situation where multiple nodes advertise themselves as roots. This case is checked at S713, and if indeed multiple nodes are advertized as roots, at S705 which of the roots has the highest rank is determined. The root with the highest rank retains its root status, whereas other nodes are not identified as root. Rank of the node could be based on the MAC ID of the node which is unique, unambiguous and advertised with each beacon. Alternatively, a rank of the node can be a function of residual energy or the global beacon slot occupied or combination of many parameters.

Thereafter, at S714, it is determined if there is any orphan node in the beacon group, and if so at S715 the root assigns one parent to each orphan node. At S716, it is determined if a new node joined the existing beacon group, and if so at S717 the joining window is updated. At S718 one of the existing nodes that heard an ascending global beacon of a newly joined node in an ascending global beacon is made the parent of the newly joined node, and the tree topology is updated accordingly.

At S719 it is checked if any node is gracefully leaving the beacon group in the next round. A master node may leave the beacon group gracefully or silently. In the case of graceful exit a node declares its intention to leave the beacon group by embedding that information in its ascending global beacon, which informs the root about node desire to leave. When a node gracefully exits, at S720 the root removes the node from the tree and updates the tree and the exiting node is purged from its parent's list of children. In addition, at S720 the leaving node children are marked as orphans and its slot is tagged as vacant. If the node is not a leaf node, at S721 the topologyDiscovery variable is set to a true value.

Nodes become orphans when their parents exit. To be able to find new parents for orphan nodes the remaining nodes must listen to orphan nodes slots. Setting the topologyDiscovery variable to a true value enables the nodes to listen to all the slots which are earlier than their own slots and later than a joining slot. It should be noted that if the root is leaving the beacon group, a node occupying the next slot becomes the root. The new root assumes its responsibility beginning the next round.

A node may silently exit the beacon group by abruptly stopping its transmission of global beacons. Thus, by comparing the beacon slot occupancy information of the current round to the membership of the beacon group the root can discover which node did not transmit its ascending global beacon. The global beacon could be missed due to interference or collision or silent exit (e.g., due to battery depletion) of the node. Accordingly, at S722, it is determined if an ascending global beacon of any existing node in the beacon group is missed, and if so at S723 a topologyDiscovery variable is set to a true value and any missing node and its children are marked as orphans. In addition, at S724 the missing node is purged from the beacon group, the tree is pruned, and the parent of that node is informed to remove the missing node from the list of children. In a preferred embodiment, step S724 is performed only if the ascending global beacon of a node is missed for a predefined number of consecutive rounds. If the ascending global beacons from the entire becon group are received, then it indicates stable topology, and therefore, at S725, the topologyDiscovery variable is set to false. The beacon slots of a node that silently exited may be preserved for a predefined number of rounds until it is removed from the beacon group by the root. This allows a master node to function normally even if it experiences collisions or interference during its global beacon period.

At S726 and S727 it is checked if any slots between the first occupied slot and last occupied slot in the ascending period remain unoccupied for a predefined number of consecutive rounds, and if so at S728, nodes are scheduled to move their slots towards the root to fill vacant slots. If a node is scheduled to move its slot towards the root, then its parent and children are informed via descending global beacons of the impending move. When the first occupied slot in an ascending period becomes vacant, the joining window is updated to reflect this change. Thus, in a stable state, there are no vacant slots between the joining slot and the root's slot. At S729, the root constructs an outgoing descending global beacon which contains updated tree information, slot occupancy information, joining slot locations, a topologyDiscovery variable and moving slot information.

If a node other than the root misses the root descending global beacon, then it sets the variables searchingForRoot and topologyDiscovery to true. This could happen, for example, due to topology changes in order to prevent propagation of the root descending global beacon to a node. This enables the node to analyze AGBs at S702 and to determine at S703 if there is any other node which is aware of the current root. If so, at S704 the node sets a slotReordering variable to a true value. The fact that a node does not receive a root descending global beacon but there are other nodes in the beacon group which do receive the root descending beacon indicates that the node is no longer among the descendants of the root. To remedy this situation it is necessary that a node which missed the root beacon move its slot to become a descendant of the root. The setting slotReordering variable forces the node to transmit its AGBs in randomly picked joining slot, thereby becoming the root descendant.

Figure 8:
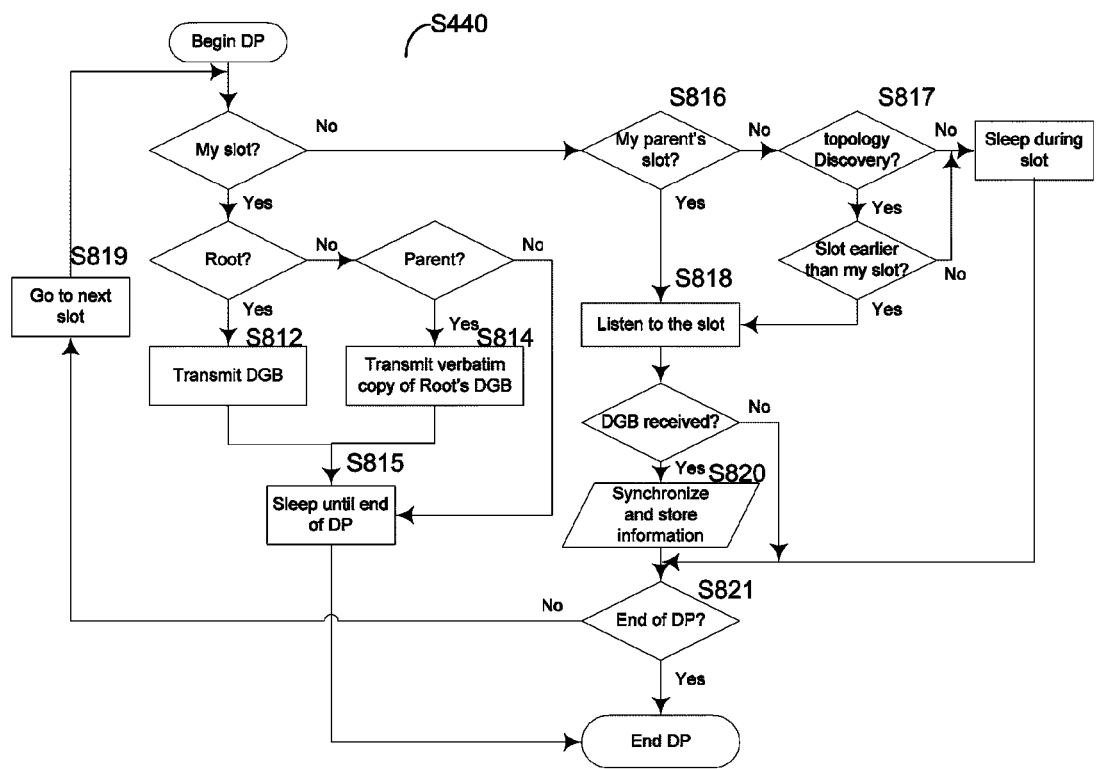
FIG. 8 is a flowchart for describing the propagation of descending global beacons during the descending period, as implemented in accordance with an embodiment of the invention.

FIG. 8 shows an exemplary flowchart S440 describing in detail the propagation of descending global beacons during the descending period, as implemented in accordance with an embodiment of the invention. A descending period begins with a root sending its descending global beacon at S812. In addition, at S814 the parent nodes transmit verbatim copy of the root descending global beacon to be received by their children. Subsequently, at S815 the root and other parents sleep until the end of the descending period. Nodes (other than the root) perform a check to determine if a current slot is owned by their parent at S816, and if so listen to their parent slot at S818. Nodes also listen to slots which occur earlier than their own slot at S818 if the topologyDiscovery variable is true at S817. At S820, nodes (other than the root) that receive a descending global beacon synchronize their clocks with their parents and store the information. Steps S821 and S819 ensure that nodes visit all time slots during the descending period.

Figure 9:
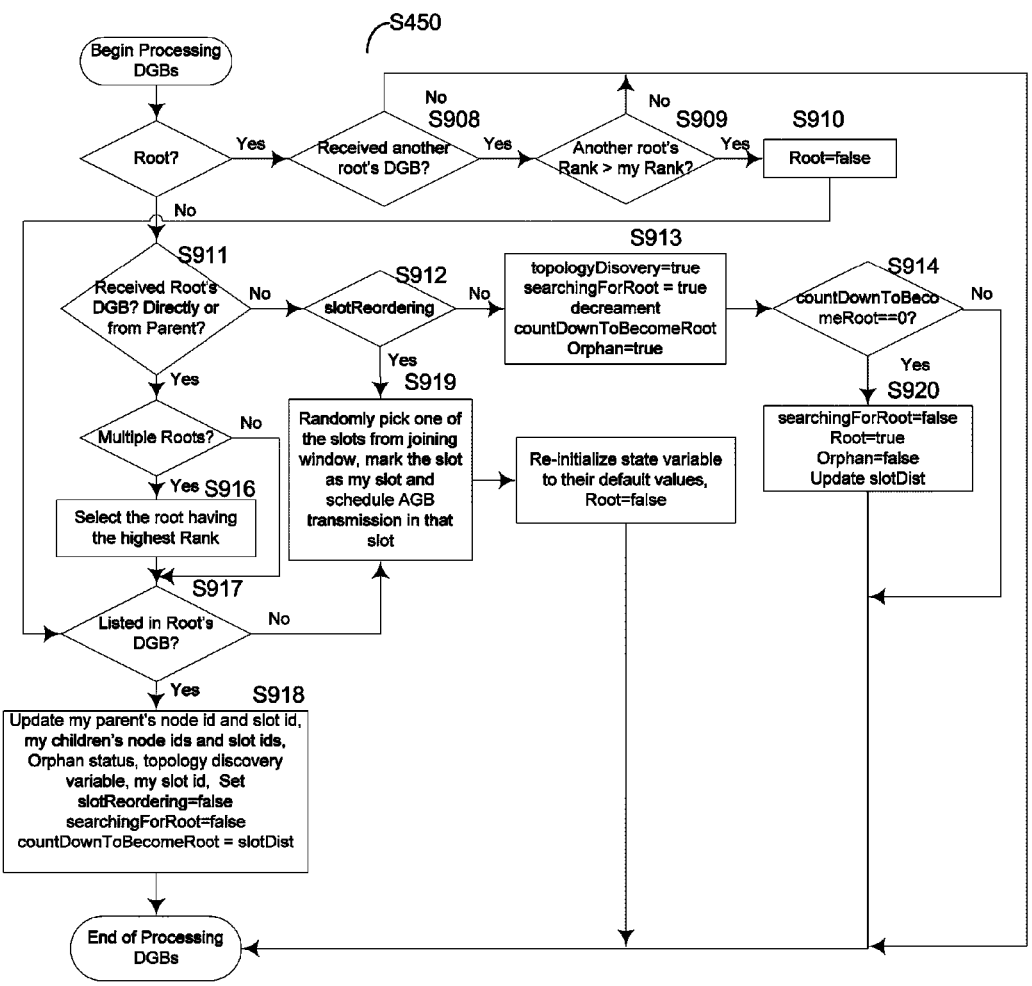
FIG. 9 is a flowchart for describing the processing of descending global beacons as implemented in accordance with an embodiment of the invention.

FIG. 9 shows an exemplary flowchart S450 describing the step of processing of descending global beacons as implemented in accordance with an embodiment of the invention. Each node (which is not a root) processes information encapsulated in descending global beacons sent by the root. At S911 it is checked whether a root descending global beacon is received by the node from its parent. In case multiple descending global beacons were received from more than one root, at S916 the root whose rank is the highest is selected as a valid root. Subsequently, at S917 a check is performed to determine whether the root has included information for this node or not. At S918 the information included in the descending global beacon, e.g., topology, slot occupancy, parent-child relationship, orphan nodes, and so on is processed by the node. Specifically, the node updates its parent node ID and its time slots, its children's node IDs and their time slots, status of orphan nodes, a topologyDiscovery variable, the node time slot, and other variables utilized for maintaining the tree topology. Since the node has received a descending global beacon from a root in the current round, it sets variables searchingForRoot and slotReordering to false. Moreover, the countdownToBecomeRoot variable is reset to the value of slotDist, which is explained in detail later.

At S911 it is checked if a node has not received a descending global beacon from a root, and if so, another check is performed at S912 to determine whether a slotReordering variable value is true or false. A true value of the slotReordering variable indicates that although the node did not receive a descending global beacon from the root, there are other nodes which received the root descending global beacon. To remedy this situation, at S919, the node randomly picks one of the joining slots and schedules an ascending global beacon transmission in the chosen slot during the ascending period. On the other hand, if the slotReordering variable value is false, at S913 the node marks itself as an orphan, a countdownToBecomeRoot variable is decremented by one and searchingForRoot and topologyDiscovery variables are set to true. The countdownToBecomeRoot is a global variable that is initialized to a value of a slotDist which is computed as follows:

slotDist={root's slot id−my slot id}+1

Based on the check performed at S914, the values of the searchingForRoot and topologyDiscovery variables remain true as long as the countdownToBecomeRoot value is different from 0. When the countdownToBecomeRoot variable reaches 0 the node becomes a root and searchingForRoot is set to false at S920. An example for handing cases where a root silently disappears is provided below.

FIG. 10 provides an example for the process of updating the tree when a root dies. The example refers to the tree topology shown in FIGS. 3A and 3B. The beacon group, joining window and time slot occupancy during the ascending period and descending period, are shown in FIGS. 3D and 3E.

Figure 3C:
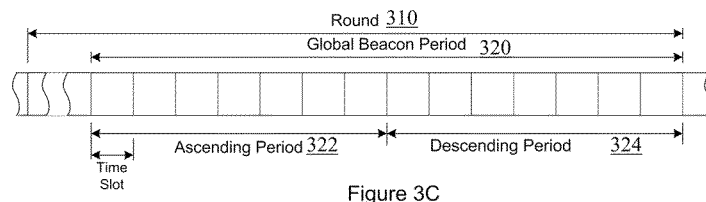
FIGS. 3C, 3D and 3E illustrate a time round, a beacon group, a joining window and time slot occupancy during ascending and descending periods.
Figure 3D:
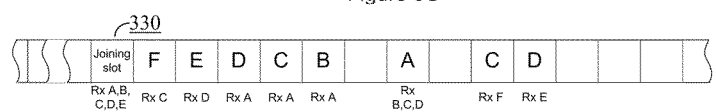
Figure 3E:
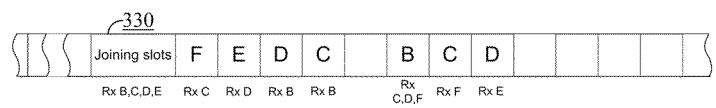
Figure 3F:
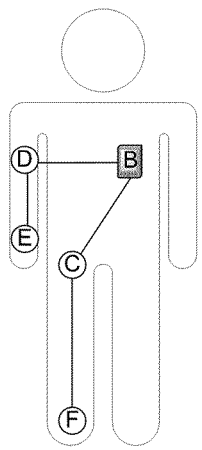
FIG. 3F illustrates an updated tree topology as a node leaves the tree.

The second column in the Table provided in FIG. 10 indicates the values of countDownToBecomeRoot variable in each node based on the slot occupancy shown in FIG. 3C. In a stable state (i.e., round n) the countDownToBecomeRoot variable is set to slotDist, which is 2 for node B, 3 for node C, and so on. Root A dies in round n. At the end of round n+2, the value of countDownToBecomeRoot variable at node B reaches 0, and node B becomes a root. During round n+3, the node B advertises itself as a root in its descending global beacon. Node B descending global beacon is received by nodes C and D, which reset their countDownToBecomeRoot variable to slotDist, as shown in the fifth column. At the end of round n+4, nodes E and F also learn of the existence of the new root B from nodes D's and C's descending global beacons respectively. Hence, at the end of round n+4 nodes E and F also reset their countDownToBecomeRoot to slotDist as shown in the last column. Gradually node B takes over node A slot, then node C takes over node B slot, and so on. Thus, all the vacant slots are filled one by one, which results in an updated global beacon slot occupancy shown in FIG. 3C and an updated topology shown in FIG. 3D.

On the other hand, if a node C does not hear the root beacons for 3 consecutive rounds (i.e., nodes A and B both have died), then it assumes the role of the root at the end of round n+3. Similarly, node D declares itself as a root at the end of the round n+4 if it does not hear from the root for 4 consecutive rounds.

Since individual nodes can autonomously declare themselves as roots, it may lead to situations where multiple roots are operating simultaneously. This kind of situation is resolved by allowing only the highest ranked root to continue functioning as a root and all other roots become ordinary nodes, as demonstrated by steps S908, S909 and S910. This shows that the proposed protocol can efficiently recover from node failures including a root failure.

It would be appreciated that teachings described herein are very attractive for body area networks (BANs) due to characteristic of the network. Specifically, body area networks (BANs) are highly localized networks where the transmission range of a BAN node is 3 meters. Thus, most nodes are in the direct communication range of each other. In any wireless network, the knowledge of a two-hop neighborhood is essential to enforce reservations and to avoid hidden node collisions. In the case of a body area network (BAN) acquiring two-hop neighborhood knowledge would be equivalent to acquiring global knowledge. Thus, gathering global information does not incur extra overhead. In addition, the global knowledge can be cleverly exploited to optimize the scheduling algorithm. The channel utilization and throughput can be improved with the global knowledge. Furthermore, the knowledge of global topology eliminates the need for a separate routing layer. This results in considerable savings in protocol overhead and a memory footprint which ultimately leads to energy savings.

Sequencing the global beacon transmissions based on a tree topology is also suitable for synchronizing the entire network. During the descending period, the root synchronizes nodes at the depth of one, which in turn synchronizes nodes at the depth two and so on.

It would be also appreciated that the above described method can also be used to exchange other types of information including, but not limited to, traffic indication map, link status, received signal strength indicator, hibernation mode indicator, channel switch descriptor, round start time offset, multicast binding, security information, and so on.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for scheduling transmissions of global beacons in a body area network (BAN), wherein the BAN includes master nodes, and the master nodes are arranged in a tree topology, the method comprising:
    propagating ascending global beacons (AGBs) from leaf nodes to a root node of the tree during an ascending period, wherein an AGB includes at least reservations of time slots during a time round;
    processing AGBs by the root node to determine time slot occupancy information;
    propagating descending global beacons (DGBs) from the root node to leaf nodes during a descending period, wherein a DGB includes at least reservations of time slots during the time round; and
    processing DGBs by the master nodes other than the root node to update at least the slot occupancy information included in the DGBs.

2. The method of claim 1, further comprising initializing each master node when the master node boots.

3. The method of claim 2, wherein initializing each master node further comprises:
    scanning for beacons during a single time round;
    declaring the master node as the root node when a global beacon has not been received during the time round; and
    setting a round start time (RST) for the master node.

4. The method of claim 3, further comprising:
    joining the master node to a beacon group when a global beacon has been received during the round time;
    synchronizing the RST of the master node to the RST of the beacon group; and
    scheduling a transmission of an AGB for the master node in one of the joining slot.

5. The method of claim 4, further comprising:
    setting the master node to perform tasks of the descending period if the master node is declared as the root node; and
    setting the master node to perform tasks of the ascending period if the master node is not declared as the root node.

6. The method of claim 1, wherein during the ascending period each master node that is not the root node performs:
    sending an AGB containing information from children nodes and orphan nodes in a time slot reserved for the master node; and
    listening to time slots of the children nodes of the master node, joining slots, or time slots that are earlier than time slots reserved for the master node and later than the joining time slots.

7. The method of claim 6, further comprising storing information included in the received AGBs.

8. The method of claim 1, wherein processing the AGBs by the root node further comprises:
    occupying unoccupied time slots based on the time slot occupancy information, wherein occupying the unoccupied slots includes:
    tagging the unoccupied slots
    instructing occupied slot owner to move its slot to fill a vacant slot and
    informing the parent and children of the impending move;
    performing tree maintenance operations to produce updated tree information; and
    constructing a DGB to include the tree information and the slot occupancy information.

9. The method of claim 8, wherein performing the tree maintenance operations further comprises:
    assigning a parent node to each orphan node in a beacon group if the beacon group includes at least one orphan node;
    assigning a parent node to a new node which joined the beacon group;
    when a master node gracefully exited the BAN performing:
        removing the master node from the tree;
        updating the beacon group; and
        updating the status of parent nodes and children nodes connected to the exited master node (S719, S720); and
    when a master node silently exited the BAN performing:
        removing the master node from the tree;
        updating the beacon group; and
        updating the status of parent nodes and children nodes connected to the exited node.

10. The method of claim 1, wherein propagating the DGBs further comprises:
    transmitting a DGB by the root node at a time slot reserved for the root node;
    transmitting a verbatim copy of the DGB by each parent node receiving the DGB to its children nodes; and
    saving information included in the received DGB or the verbatim copy of the DGB.

11. The method of claim 10, wherein the verbatim copy of the DGB is utilized to synchronize clocks between the parent master nodes and their children nodes.

12. The method of claim 10, wherein processing the DGBs by nodes other than root further comprises:
    receiving the verbatim copy of the DGB; and
    updating tree information based on information included in the DGB.

13. The method of claim 12, further comprising:
    declaring a node occupying a time slot adjacent to a time slot of the current root node as a new root node when a DGB sent by a root is not received at a node other than the root node,
    triggering slot reordering when a DGB sent by a root node is not received at a node other than the root node, wherein the slot reordering includes:
    randomly selecting one of joining time slots; and
    scheduling AGB transmission in the selected slot during the ascending period.

14. A non-transitory computer readable medium having stored thereon computer executable code, when executed, causing a processor to perform a process of scheduling transmissions of global beacons in a body area network (BAN), wherein the BAN includes master nodes, and the master nodes are arrange in a tree topology, the process comprising:
    propagating ascending global beacons (AGBs) from leaf nodes to a root node of the tree during an ascending period, wherein an AGB includes at least reservations of time slots during a time round;
    processing AGBs by the root node to determine time slot occupancy information
    propagating descending global beacons (DGBs) from the root node to leaf nodes during a descending period, wherein a DGB includes at least reservations of time slots during the time round; and processing DGBs by the master nodes other than the root node to update at least the slot occupancy information included in the DGBs.

15. The non-transitory computer readable medium of claim 14, where the process further comprises: initializing each master node when the master node boots.

* * * * *